United States Patent
Attard

(10) Patent No.: US 6,773,079 B2
(45) Date of Patent: Aug. 10, 2004

(54) BOOSTED BRAKING DEVICE WITH EMERGENCY VALVE

(75) Inventor: Jean-Marc Attard, Villers sous St Leu (FR)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 10/089,825

(22) PCT Filed: Nov. 21, 2001

(86) PCT No.: PCT/FR01/03654

§ 371 (c)(1),
(2), (4) Date: Apr. 4, 2002

(87) PCT Pub. No.: WO02/42139

PCT Pub. Date: May 30, 2002

(65) Prior Publication Data

US 2002/0149260 A1 Oct. 17, 2002

(30) Foreign Application Priority Data

Nov. 24, 2000 (FR) .............................. 00 15303

(51) Int. Cl.⁷ .............................................. B60T 8/60
(52) U.S. Cl. ....................................................... 303/155
(58) Field of Search .............................. 303/155, 114.1, 303/114.3, 113.3, 115.1; 60/588, 589, 552, 551, 553, 554, 586, 562, 548

(56) References Cited

U.S. PATENT DOCUMENTS 5,249,423 A  * 10/1993 Nakamura et al. ............. 60/562
6,343,472 B1 *  2/2002 Gault ........................... 60/588
6,352,316 B1 *  3/2002 Oka et al. ................. 303/114.3
6,415,605 B1 *  7/2002 Takasaki et al. .............. 60/548
6,578,360 B2 *  6/2003 Mouri et al. ................... 60/562

\* cited by examiner

Primary Examiner—Jack Lavinder
Assistant Examiner—Melanie Torres
(74) Attorney, Agent, or Firm—Leo H. McCormick, Jr.

(57) ABSTRACT

A braking device, for a motor vehicle, comprising: a master cylinder (2), a primary piston (3) mounted to slide in the master cylinder, a manual-control member (4), a booster coupled to the manual-control member, an emergency assist valve (VA) comprising a reaction piston (17a) and a rapid piston (17b), and a ratio control (T) actuated by a plunger distributor (10) driven by the manual-control member (4). The reaction piston (17a) and the rapid piston (17b) form one and the same stepped piston (17) having a part (17a) of large cross section and a part (17b) of small cross section, the large-section part (17a) determining, with a first bore (18) of the primary piston (3), a variable-volume annular chamber (27). A separation/communication assembly (28, 29, 30), controlled by the displacement of the stepped piston (17), is designed so that the pressure of the liquid is exerted effectively on the large cross section (17a) of the stepped piston when the stepped piston occupies a position of rest or is to the rear of the position of rest, and on only the small cross section (17b) when the stepped piston is displaced forward relative to the main piston under emergency braking.

10 Claims, 3 Drawing Sheets

BOOSTED BRAKING DEVICE WITH EMERGENCY VALVE

The invention relates to a boosted braking device, for a motor vehicle, of the kind which comprise a master cylinder controlling the pressure in at least one brake circuit; a primary piston mounted to slide in the master cylinder to create therein a variation in pressure, this primary piston being subjected to an actuating force made up of an input force exerted by a manual-control member and of a boost force exerted by a booster which is coupled to the manual-control member.

BACKGROUND OF THE INVENTION

The booster may be pneumatic and comprise a rigid casing divided into two pneumatic chambers by a moving partition which may be subjected to a difference in pressure between the chambers under the action of a valve actuated by the manual-control member.

A braking device of this type is known, for example, from EP-B-0 662 894.

The conditions under which braking is exerted may differ. A first instance corresponds to ordinary conditions when an obstacle is seen from a distance and braking is performed relatively gently; this type of braking is known as "normal braking" or "slow braking". Another instance is that of abrupt braking or "emergency braking", for example when an obstacle appears suddenly in front of the driver who has to bring his vehicle to rest as quickly as possible.

With a view to satisfying these various braking conditions, a boosted braking device, of the type defined previously, has been supplemented by an emergency assist valve capable of initiating the intervention of at least two boost ratios corresponding respectively to slow braking and to emergency braking; the boost ratio for slow braking is lower and the hydraulic reaction opposing the advancement of the manual-control member is greater. In the case of emergency braking, the boost ratio is stronger and the hydraulic reaction against the manual-control member is weaker, which means that the driver can brake for longer and more heavily.

By convention, the term "front" will be used in the remainder of the text to mean a direction directed from the control member toward the master cylinder, and the term "rear" or "back" will be used to denote the opposite direction.

SUMMARY OF THE INVENTION

The emergency assist valve comprises a reaction piston which slides in a sealed manner in a bore of the primary piston, the front part of this bore communicating with the interior volume of the master cylinder, a rapid piston of cross section smaller than that of the reaction piston sliding in a sealed manner in a bore of corresponding diameter of the primary piston, and a ratio control actuated by a plunger distributor itself driven by the manual-control member, the assembly being arranged in such a way that under emergency braking, the hydraulic reaction is exerted only on the small cross section of this rapid piston. The slow boost ratio involves the larger-section reaction piston.

A braking device such as this with an emergency assist valve is entirely satisfactory from the operational and braking force point of view. However, embodiments hitherto proposed for the emergency assist valve are relatively bulky with a relatively high number of parts giving rise to a not insignificant cost of manufacture.

It is an object of the invention, above all, to provide a braking device with a more compact emergency assist valve and which has a lower cost of manufacture.

According to the invention, a boosted braking device, for a motor vehicle, of the type defined previously, comprising an emergency assist valve, is characterized in that the reaction piston and the rapid piston form one and the same stepped piston having a part (reaction piston) of large cross section and a part (rapid piston) of small cross section, the large-section part determining, with the corresponding bore of the primary piston, an annular chamber, the volume of which varies according to the displacement of the stepped piston relative to the primary piston, and that separation/communication means, controlled by the displacement of the stepped piston are designed so that the pressure of the liquid is exerted effectively on the large cross section of the stepped piston when the latter occupies its position of rest or is to the rear of this position, and on only the small cross section when the stepped piston is displaced forward relative to the primary piston under emergency braking.

The large-section part of the stepped piston may lie toward the front and the small-section part toward the rear. The small-section part may have a shoulder against which there bears axially a washer acting as a thrust washer for a compression spring, the other end of which bears against a stop piece anchored in a housing of the primary piston.

The means of separation between the large and small cross section of the stepped piston may be connected to the primary piston. A blind bore is advantageously provided in the stepped piston and open forward, this blind bore communicating, toward its interior end, via at least one hole, with the periphery of the small-section piston, while a sealing means, connected to the primary piston, is provided in the annular chamber, around the small-section piston, to collaborate with the hole(s) in the small-section piston. When the hole(s) is (are) to the rear of the sealing means, the front part of the annular chamber is isolated from the hydraulic pressure of the master cylinder, which means that this pressure acts effectively on the entire area of the large cross section, whereas when the hole(s) is (are) in front of the sealing means, the hydraulic pressure is exerted in the front part of the annular chamber in such a way that this pressure is effective on only the small cross section. The sealing means advantageously consists of a lip seal.

As a preference, the small-section piston is extended toward the plunger distributor by a rod of smaller diameter forming the ratio control. There may be a gap at rest between the rear end of the rod and the plunger distributor.

Apart from the provisions set out hereinabove, the invention consists in a certain number of other provisions which will be dealt with more explicitly hereinafter with regard to an exemplary embodiment described with reference to the appended drawings

DETAILED DESCRIPTION OF THE INVENTION

The overall structure and general operation of a boosted braking device of the type of the invention are known, particularly from patents EP-B-0 662 894 or FR-B-2 658 466 and only a brief reminder thereof will be given. For further details, reference may be made to the two aforementioned patents which are incorporated into the description by reference.

Figure 1:
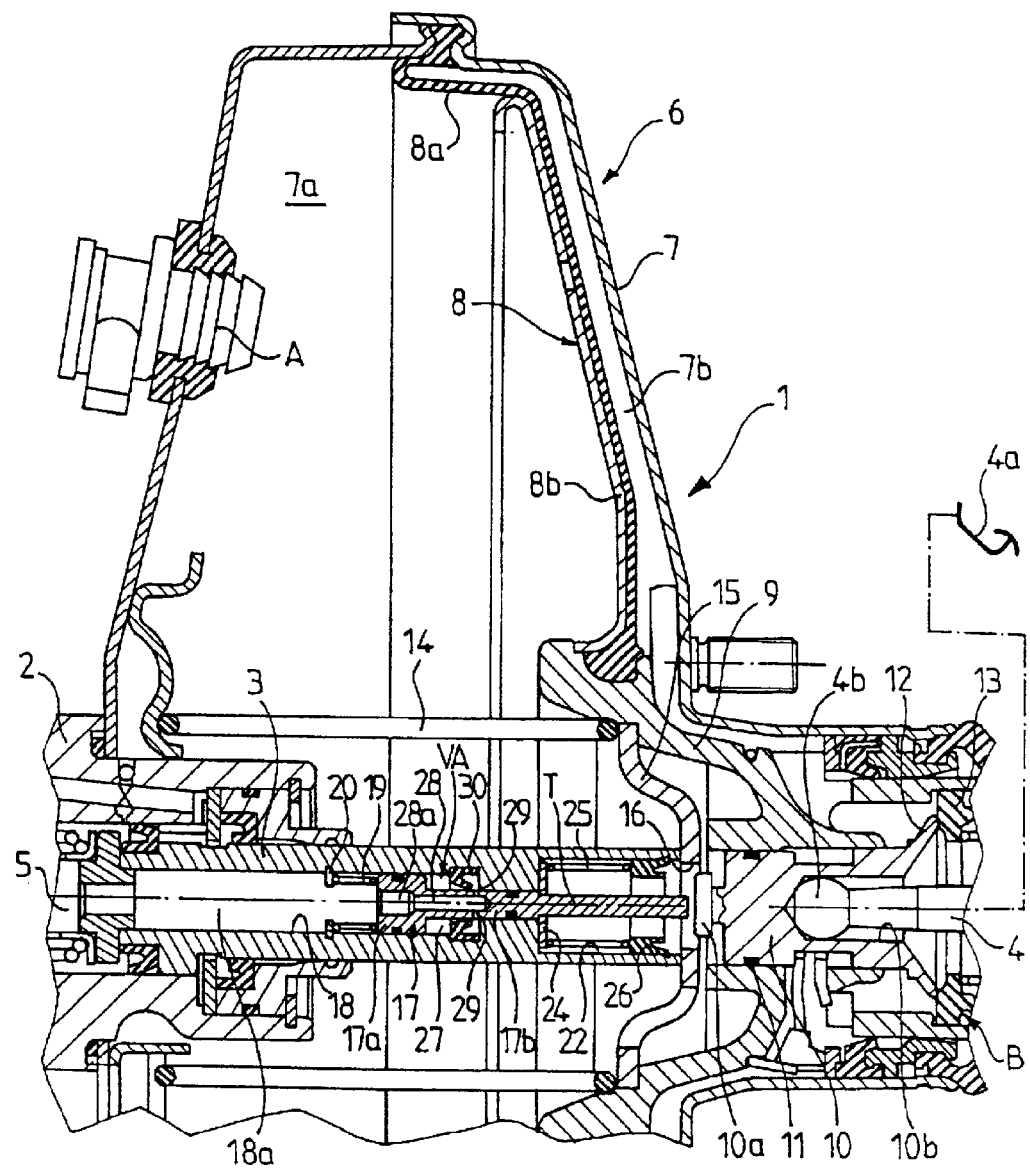
FIG. 1 is a part view in section with partial cutaway of a braking device according to the invention.

FIG. 1 shows a braking device 1 for a motor vehicle, which comprises a master cylinder 2, partially depicted, and a primary piston 3 mounted to slide in the master cylinder 2. A manual-control member 4 comprising a linkage coaxial with the primary piston 3 is designed to exert on this piston an input force from back to front, that is to say from right to left according to the depiction of FIG. 1. The forward displacement of the primary piston 3 creates an increase in pressure of the liquid in the interior volume 5 of the master cylinder, connected to at least one hydraulic brake circuit. The control member 4 is generally actuated by a brake pedal 4a, depicted schematically.

A pneumatic booster 6 is coupled to the control member 4. The booster 6 comprises a rigid casing 7 divided internally in a sealed manner into two pneumatic chambers 7a, 7b by a moving partition 8 comprising an elastomer diaphragm 8a and a rigid skirt 8b. The chamber 7a is permanently connected to a source of vacuum (not depicted) by a nozzle A. A pneumatic piston 9 in the form of a sleeve coaxial with the primary piston 3 is fixed to the rigid skirt 8b. The pneumatic piston 9 is mounted to slide, in a sealed manner, on a plunger distributor 10, of cylindrical overall shape. Sealing is provided by an O-ring 11.

The plunger distributor 10 comprises, toward the front, a head 10a and, toward the rear, a blind axial housing 10b, open toward the rear, which receives a bore 4b provided at the end of the linkage 4. The plunger distributor 10 comprises, on the opposite side to the piston 3, a frustoconical widening 12 which bears in a sealed manner against an elastomer ring 13 connected in terms of axial translation to the pneumatic piston 9. The assembly 12, 13 constitutes part of a three-way valve B (depicted partially) which either allows the chamber 7b to be isolated from the atmosphere and the chambers 7a, 7b to be placed in communication or allows the chambers 7a, 7b to be isolated from one another and air at atmospheric pressure to be let into the chamber 7b when the widening 12 moves axially away from the ring 13.

The pneumatic piston 9 is returned toward its position of rest, depicted in FIG. 1, by a compression spring 14 arranged between the piston 9 and the wall opposite belonging to the casing 7 to which the master cylinder 2 is connected. A cup 15 with a central opening 16 bears axially via its exterior peripheral edge against a shoulder of the pneumatic piston 9. The spring 14 presses the edge of this cup against the piston 9. The cup 15 bears axially, via the interior edge surrounding its opening 16, against the rear end of the primary piston 3. The outside diameter of the head 10a is smaller than the diameter of the opening 16.

An emergency assist valve VA is designed to initiate the intervention of at least two boost ratios corresponding respectively to normal (slow) braking and to emergency braking.

The valve VA comprises a single stepped piston 17 having a part 17a of large cross section situated toward the front and constituting a reaction piston, and a part 17b of small cross section, situated at the rear, constituting a rapid piston.

The part 17a is mounted to slide in a sealed manner by virtue of an O-ring, in a bore 18 of the primary piston 3. The front part 18a of this bore communicates with the interior volume 5 of the master cylinder. A helical compression spring 19 bears against the front face of the part 17a and against a split ring 20 anchored in a groove of the bore 18, in front of the part 17a. The spring 19 pushes the stepped piston 17 backward. The rear part 17b of the stepped piston slides in a bore 18b of corresponding diameter, in a sealed manner by virtue of an O-ring. The bore 18b is coaxial with the main bore 18 which it extends backward. The entry to the bore 18b has a frustoconical chamfer 18c. The part 17b is extended, backward, by a coaxial rod T of smaller diameter, forming the ratio control. A shoulder 21 marks the transition between the part 17b and the rod T. The rod T passes through a bore 22, of diameter greater than the bore 18, which follows on from the bore 18b backward and opens toward the head 10a against which the rod T can bear. At rest, there may be an axial clearance of the order of one millimeter or several millimeters between the rear end of the rod T and the head 10a. The transition between the bore 18b and the bore 22 is marked by a radial shoulder 23 forming the end of the bore 22. A washer 24 is engaged around the rod T. This washer 24 has a central hole, the diameter of which is equal, give or take the sliding clearance, to that of the rod T. The edge of the interior hole of the washer 24 may be stopped by the shoulder 21. The outside diameter of the washer 24 is smaller than the diameter of the bore 22.

A helical compression spring 25 is arranged between the washer 24 and a rear stop piece formed by a clip-in ring 26, for example made of plastic, anchored in the interior wall of the bore 22.

The large-section part 17a of the stepped piston 17 determines, with the end 18d of the large-section part of the bore 18, an annular chamber 27, the volume of which varies according to the displacement of the stepped piston 17 relative to the primary piston 3.

A blind bore 28 is pierced axially in the stepped piston 17 and opens on the same side as the master cylinder 2, following an entry 28a of larger diameter.

Figure 2:
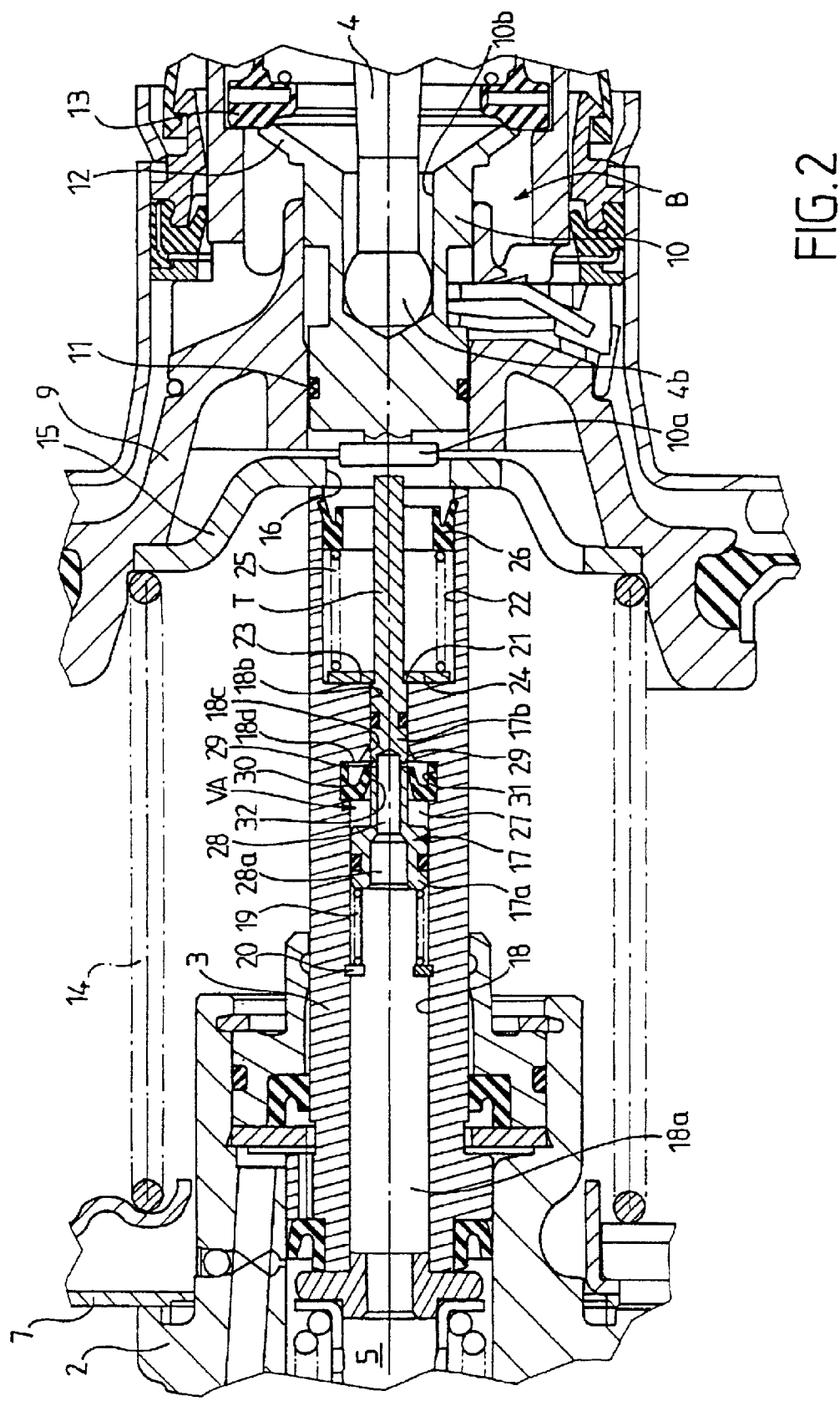
FIG. 2 is a part view in section, on a larger scale, of elements of FIG. 1 and of the emergency assist valve, the braking device being in the position of rest.

The blind bore 28 is extended into the small-section part 17b of the piston 17. Near the end of the bore 28, radially-directed holes 29 place the blind bore 28 in communication with the periphery of the part 17b. The length of the bore 28 and the axial position of the holes 29 is such that when the piston 17 occupies the position of rest depicted in FIG. 1 and FIG. 2, the holes 29 are just in front of the end 18d of the large-section part of the bore 18.

A lip seal 30 with sufficient elasticity and sufficient rigidity, for example made of elastomer, is housed in an annular groove 31 provided in the bore 18 of the primary piston 3. The seal 30, connected to the piston 3, bears axially against the end 18d. The lip 32 of the seal 30 determines a frustoconical surface constituting a kind of funnel shape, the small base of which faces toward the end 18d. The lip 32 bears in a sealed manner against the exterior surface of the small-section part 17b of the stepped piston. The rear end of the lip 32 is in front of the holes 29 when the stepped piston 17 is in the position of rest of FIGS. 1 and 2.

The lip seal 30 is designed to withstand the hydraulic pressure that may be exerted behind it and to prevent this pressure from being transmitted to that part of the chamber 27 which lies in front of the seal 30. By contrast, if the pressure in the front part of the chamber 27 increases, the lip 32 of the seal 30 can deform and move radially away from the part 17b to allow liquid to pass and allow the pressure to drop.

A forward displacement of the stepped piston 17 relative to the primary piston 3 causes the holes 29 to move from behind to in front of the zone of contact of the lip 32 with the exterior surface of the part 17b.

The assembly made up of the lip seal 30 and the holes 29 constitutes a kind of non-return valve, allowing liquid to flow in one direction and impeding this flow in the other direction. The seal 30 and the holes 29 are one non-limiting example of means of separation/communication between the large-section part 17a and the small-section part 17b of the piston 17 with feed or drainage of the annular chamber 27 controlled by the displacement of the stepped piston 17. Any device equivalent to the combination of the seal 30 and the holes 29 may be used.

That being the case, the way in which the braking device works remains conventional and only a brief reminder thereof will be given.

In the case of normal braking, the manual-control member 4 is displaced, relatively slowly, to the left. The valve B is actuated and first of all cuts off communication between the chambers 7a and 7b, then the frustoconical widening 12 moves away from the elastic ring 13, which allows air at atmospheric pressure to be let into the chamber 7b of the pneumatic booster 6. The moving partition 8 transmits the boost force to the pneumatic piston 9, which moves forward against the action of the spring 14. The piston 9 drives the cup 15, which pushes the primary piston 3 forward. The pressure of the liquid increases in the volume 5 and in the bore 18 and in the volume lying behind the seal 30, this volume communicating via the holes 29 with the blind bore 28 and the bore 18. The seal 30 prevents pressure from being transmitted to the front part of the chamber 27.

Liquid pressure on the large-section part 17a of the piston 17 generates a backward force. When this force reaches and exceeds the preload of the spring 25, the stepped piston 17 retreats, pushing the washer 24 against the action of the spring 25 until such time as the rod T comes into abutment against the head 10a.

This phase corresponds to a jump phase, during which no reaction opposes the advancement of the member 4, whereas a reduction in the volume of the chamber 27 occurs; any possible increase in the pressure in this chamber 27 is limited because the lip 32 allows backward flow.

Under the action of the input force on the member 4, the plunger distributor 10 continues its forward displacement; the pneumatic piston 9 follows the plunger distributor 10 and pushes the primary piston 3 with the boost force.

When saturation (maximum boost force) is reached, the manual input force exerted on the member 4 is transmitted mechanically to the primary piston 3 and allows the braking pressure to increase.

Under normal braking, the holes 29 remain behind the lip 32. The pressure of the liquid in the bore 18 is exerted over the entire cross section of the part 17a because the seal 30 prevents a back-pressure from arising in the rear annular zone of the head 17a around the part 17b. The hydraulic reaction opposing the advancement of the plunger distributor 10 and of the member 4 is relatively strong.

Figure 3:
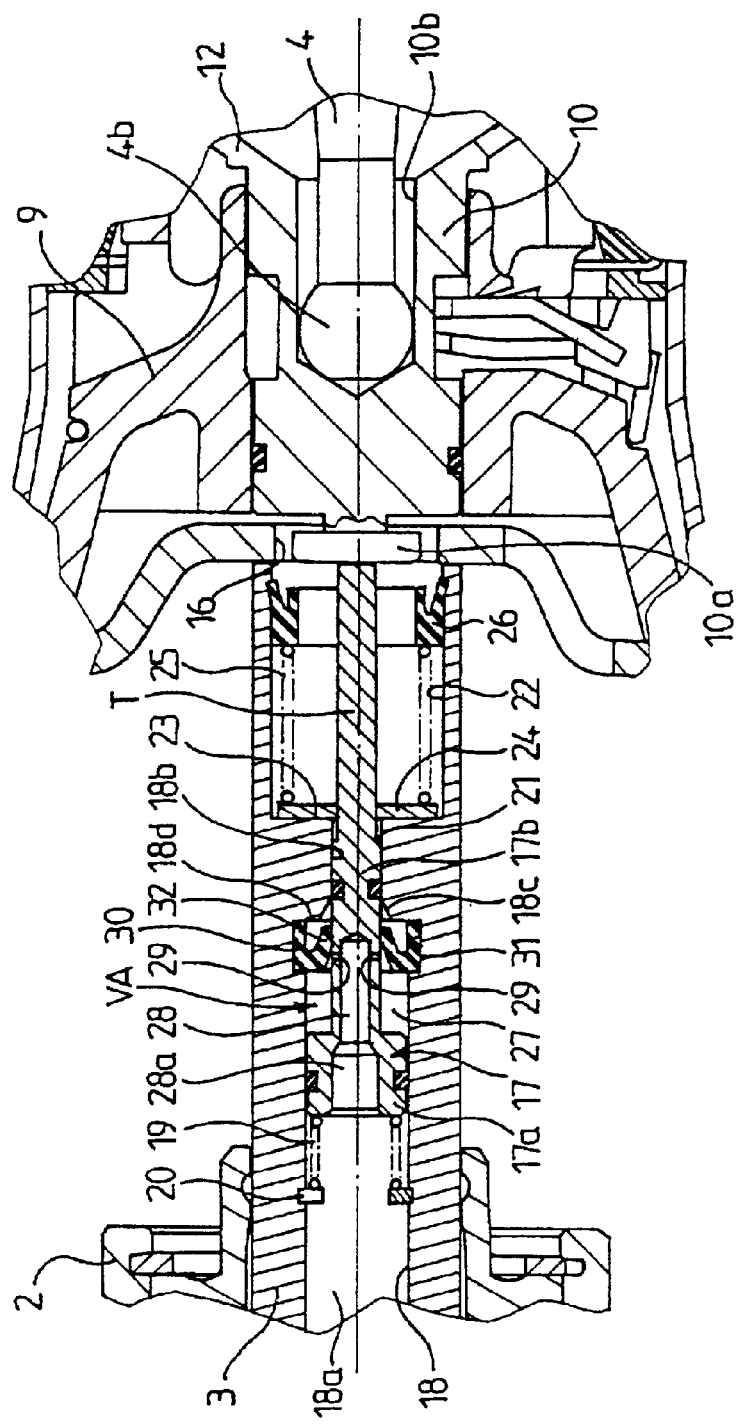
FIG. 3, finally, shows, in a similar way to FIG. 2, the elements at the onset of rapid braking.

Under rapid braking (FIG. 3), the plunger distributor 10 is initially displaced more rapidly than the pneumatic piston 9 and the primary piston 3. The head 10a comes into contact with the rod T and pushes on it. The stepped piston 17 is displaced forward with respect to the primary piston 3, compressing the spring 19.

The holes 29 will move from behind to in front of the lip 32 which means that the pressure of the liquid in the bore 18 is transmitted, via the holes 29, to the part of the chamber 27 lying in front of the seal 30.

In this way, the hydraulic pressure will be effective, that is to say will exert backward thrust, only on the small cross section 17b. The reaction on the stepped piston 17 is thus lessened. This reaction which is weaker than it was under normal braking, makes it possible to obtain a high braking pressure in a minimum length of time.

The emergency assist valve VA according to the invention is compact and contains a low number of parts, which makes it possible for its cost of manufacture to be reduced.

What is claimed is:

1. A boosted braking device for use in a motor vehicle, comprising: a master cylinder for controlling the pressure in at least one brake circuit; a primary piston mounted to slide in the master cylinder to create therein a variation in pressure, said primary piston being subjected to an actuating force made up of an input force exerted by a manual-control member and of a boost force exerted by a booster that is coupled to a manual-control member; an emergency assist valve comprising a reaction piston that slides in a sealed manner in a first bore of said primary piston, said first bore having a front part that is in communicating with an interior volume of said master cylinder, a rapid piston having a cross section that is smaller than a cross section of said reaction piston and sliding in a sealed manner in a second bore of corresponding diameter of said primary piston, and a ratio control actuated by a plunger distributor driven by said manual-control member, said primary piston, reaction piston and rapid piston being arranged in such a way that under emergency braking, a hydraulic reaction is exerted only on said smaller cross section of the rapid piston, characterized in that said reaction piston and said rapid piston form one and the same stepped piston having a part of large cross section and a part of small cross section, said large cross section part defining within said first bore of the primary piston an annular chamber, said annular chamber having a volume that varies according to a displacement of the stepped reaction piston relative to the primary piston and said separation/communication means and being controlled by the displacement of the stepped reaction piston so that the pressure of the liquid is exerted on said large cross section part of the stepped reaction piston when said reaction piston occupies a position of rest or is to the rear of said position of rest, and on only said small cross section part when the stepped reaction piston is displaced forward relative to said primary piston under emergency braking, said separation/communication means comprise a blind bore located in said stepped reaction piston and open forward, said blind bore communicating, toward its interior end, via at least one hole, with the periphery of the said small cross section part of said rapid piston, while a sealing means, connected to said primary piston, is provided in said annular chamber, around said small cross section part of said rapid piston, to collaborate with said one hole in said small cross section part of said rapid piston.

2. The braking device according to claim 1, characterized in that said separation/communication means comprise a means of separation between said large cross section part and said small cross section part, connected to said primary piston.

3. The braking device according to claim 2, characterized in that said separation/communication means comprise a blind bore provided in the stepped reaction piston and open forward, said blind bore communicating, toward its interior end, via at least one hole, with the periphery of said small cross section part of said rapid piston, while a sealing means, connected to the primary piston, is provided in the annular chamber, around said small cross section part of said rapid piston, to collaborate with said one hole in said small cross suction part of said rapid piston.

4. The braking device according to claim 2, characterized in that said sealing means consists of a lip seal of lip.

5. The braking device according to claim 3, characterized in that said sealing means consists of a lip seal of lip.

6. The braking device according to claim 1, characterized in that said large cross section part of the stepped reaction piston lies toward the front and the small cross section part lies toward the rear.

7. The braking device according to claim 6, characterized in that said small cross section part comprises a shoulder against which axially bears a washer acting as a thrust washer for a compression spring, the other end of which bears against a stop piece anchored in a housing of the primary piston.

8. The braking device according to claim 1, characterized in that said small cross section part of said rapid piston is extended toward the plunger distributor by a rod of smaller diameter.

9. The braking device according to claim 8, characterized in that a gap exists at rest between the rear end of the rod and the plunger distributor.

10. The braking device according to claim 1, characterized in that a compression spring bears against the large cross section part of the stepped reaction piston and against a spilt ring anchored in a groove of said first bore of the primary piston.

* * * * *